United States Patent [19]

Giannuzzi

[11] 4,330,230
[45] May 18, 1982

[54] ANCHOR BOLT ASSEMBLY

[76] Inventor: Louis N. Giannuzzi, 4 Shelter Dr., Cos Cob, Conn. 06807

[21] Appl. No.: 151,838

[22] Filed: May 21, 1980

Related U.S. Application Data

[60] Continuation-in-part of Ser. No. 135,858, Mar. 31, 1980, which is a division of Ser. No. 930,741, Aug. 3, 1978, Pat. No. 4,195,547.

[51] Int. Cl.³ ............................................. F16B 13/06
[52] U.S. Cl. ......................................... 411/55; 411/57
[58] Field of Search ....................... 411/55, 57, 59, 60, 411/58, 70, 44, 15

[56] References Cited

U.S. PATENT DOCUMENTS

| | | | |
|---|---|---|---|
| 1,035,277 | 8/1912 | Veres | 411/53 |
| 3,171,322 | 3/1965 | Kaplan | 411/57 |
| 3,227,031 | 1/1966 | Williams | 411/26 |
| 3,443,474 | 5/1969 | Blakeley et al. | 411/43 |
| 3,750,519 | 8/1973 | Lerich | 411/59 |
| 3,955,464 | 5/1976 | Fischer | 411/18 |
| 3,958,488 | 5/1976 | Fischer | 411/44 |
| 4,019,420 | 4/1977 | Fischer | 411/49 |
| 4,195,547 | 4/1980 | Giannuzzi | 411/54 |

FOREIGN PATENT DOCUMENTS 1453435 10/1976 United Kingdom .................. 411/52

Primary Examiner—Ramon S. Britts
Attorney, Agent, or Firm—Michael Ebert

[57] ABSTRACT

An anchor bolt assembly insertable in a masonry hole for fastening a fixture thereto. The assembly is constituted by a threaded bolt whose lower end terminates in an expander element, the bolt extending through an expandable sleeve and being threadably received in a tube having an enlarged head engageable by a torque-producing tool. Interposed between the tube and the sleeve is a deformable ring. When the assembly is inserted through a hole in the fixture into the masonry hole with the head thereof outside the fixture, and the head is then turned by the tool, this causes the bolt to advance toward the tube and causes the expander element to force its way into the sleeve to effect expansion thereof against the wall of the masonry hole until a point is reached at which the assembly is locked in the hole and no further bolt advance is possible. Further turning of the head causes the tube to advance toward the locked sleeve to deform the ring therebetween until a point is reached where the head is tightly pressed against the face of the fixture to secure the fixture to the masonry surface and prevent displacement thereof.

6 Claims, 4 Drawing Figures

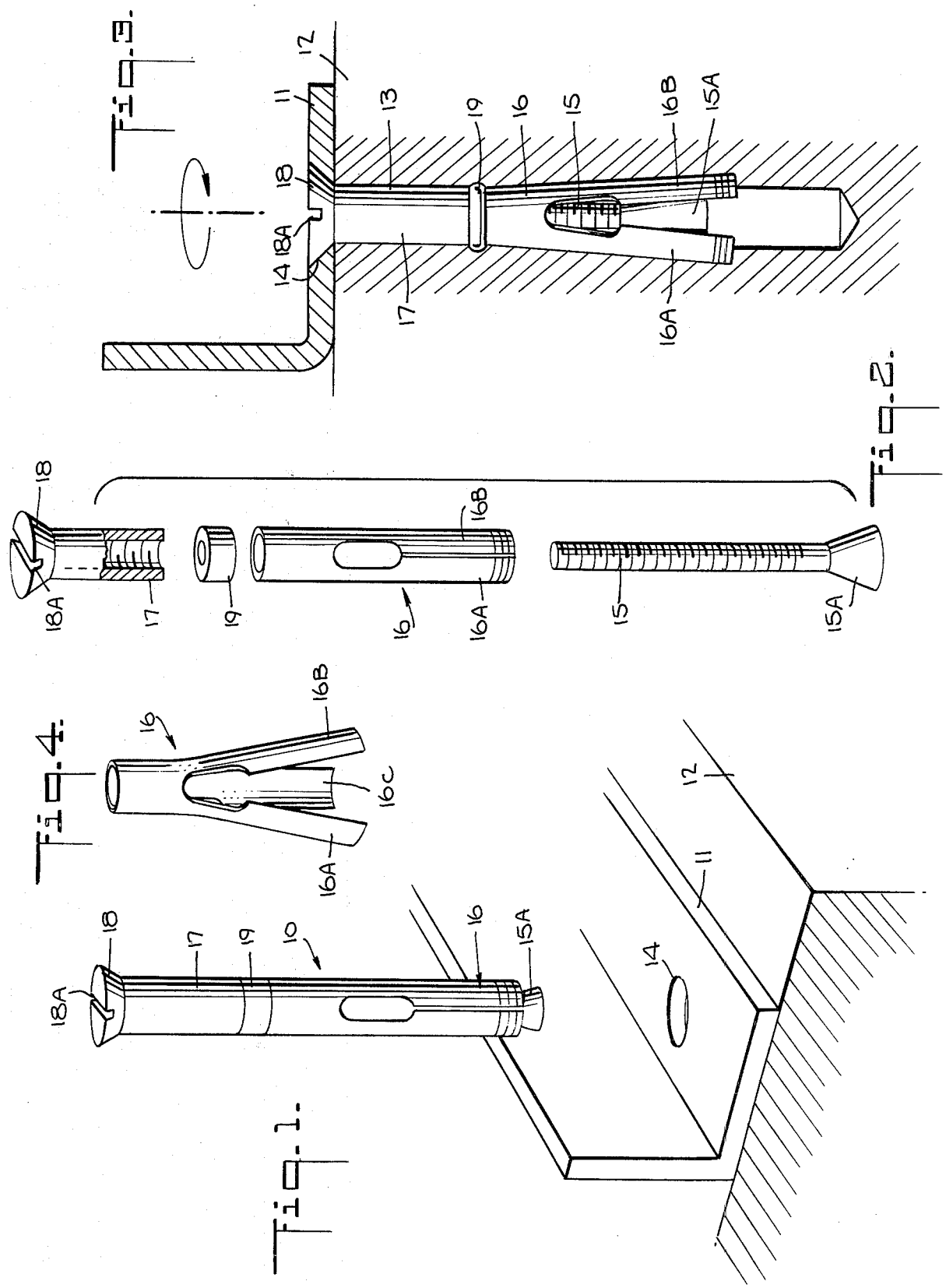

ANCHOR BOLT ASSEMBLY

RELATED APPLICATION

This application is a continuation-in-part of pending application entitled "Anchor Bolt Assembly," filed Mar. 31, 1980, and given Ser. No. 135,858, which in turn is a division of Ser. No. 930,741, filed Aug. 3, 1978, now U.S. Pat. No. 4,195,547.

BACKGROUND OF INVENTION

This invention relates generally to anchor bolt assemblies of the expansion type adapted to fasten fixtures to masonry surfaces, and more particularly to an assembly which when installed in a hole drilled in the masonry is not only anchored in the hole but also acts to press the fixture against the masonry surface, thereby resisting displacement of the fixture.

It is frequently necessary to bolt fixtures and other heavy parts to the surface of brickwork, concrete and other forms of masonry. For this purpose, it is the conventional practice to make use of an anchor bolt assembly having an expansible shell which serves to securely retain the bolt within the masonry hole. Anchor bolt assemblies come in diverse forms; but in all such assemblies, some means are provided to bring about the dilation of an expansible shell or similar component against the wall of the masonry hole to anchor the bolt therein.

Typical of prior art expansion type anchor bolt assemblies is that disclosed in the Zefferer U.S. Pat. No. 3,742,809 in which the bolt has a conically-tapered rear end portion which cooperates with an expansion sleeve so that when the bolt is turned with a wrench or other torque-producing tool, the tapered rear end thereof advances into the expansion sleeve which is thereby forced outwardly to anchor the bolt in the masonry hole.

Anchor bolts of the type heretofore known are difficult to install properly in a manner whereby the bolt is not only anchored in the hole drilled in the masonry, but the head of the bolt is firmly pressed against the face of the fixture so that the fixture is not loose and cannot be displaced.

For example, in installing an anchor bolt of the Zefferer type which passes through a hole in the fixture into a hole in the masonry, the head of the bolt must be located away from the face of the fixture before the bolt is tightened. The installer must guess the amount of expansion that will be required of the expansion sleeve when turning the bolt to obtain the proper hold on the masonry, inasmuch as the head of the bolt must then be firmly in contact with the fixture being fastened when expansion is complete.

In practice, this is difficult to do; and in many cases, even though the bolt is anchored in the masonry hole, the head of the bolt is not in secure contact with the fixture, yet no further turning of the bolt is possible to tighten this contact. In this situation, which is often encountered with conventional anchor bolts, the fixture is loose and not properly fastened to the masonry.

The following prior art patents are of general interest in connection with anchor bolts:

McIntyre U.S. Pat. No. 4,056,037
Craig U.S. Pat. No. 332,701
Ploch U.S. Pat. No. 3,523,842
Polos U.S. Pat. No. 3,878,264
Polmon U.S. Pat. No. 3,270,793
McNulty U.S. Pat. No. 798,440
Lewis U.S. Pat. No. 2,667,099
Dempsey U.S. Pat. No. 2,988,950
Giannuzzi U.S. Pat. No. 3,766,819

SUMMARY OF INVENTION

In view of the foregoing, the main object of this invention is to provide an anchor bolt assembly which not only locks into a masonry hole but also acts to positively press a fixture held by the assembly against the surface of the masonry to resist displacement thereof.

More particularly, an object of this invention is to provide an assembly of this type having a head turntable by a torque-producing tool, whereby turning of the head first causes the assembly to anchor in the masonry hole, continued turning causing the head to press against the face of the fixture and to secure the fixture on the masonry surface to prevent displacement thereof.

Yet another object of this invention is to provide an anchor bolt assembly of simple, inexpensive design which may be mass-produced.

Briefly stated, these objects are attained in an anchor bolt assembly insertable in a masonry hole for fastening a fixture thereto. The assembly is constituted by a threaded bolt whose lower end terminates in an expander element in the form of a truncated cone, the bolt extending through an expandable sleeve and being threadably received in a tube having an enlarged head engageable by a torque-producing tool. Interposed between the tube and the sleeve is a deformable ring.

When the assembly is inserted through a hole in the fixture into the masonry hole with the head thereof outside the fixture, and the head is then turned by a tool, this causes the bolt to advance toward the tube and causes the expander element to force its way into the sleeve to bring about expansion thereof against the wall of the masonry hole until a point is reached where the assembly is anchored in the hole and no further bolt advance is possible. Further turning of the head causes the tube to advance toward the locked sleeve to deform the ring therebetween until a point is reached where the head is pressed against the face of the fixture to secure the fixture to the surface and prevent displacement thereof.

OUTLINE OF DRAWINGS

For a better understanding of the invention as well as other objects and further features thereof, reference is made to the following detailed description to be read in conjunction with the accompanying drawings, wherein:

FIG. 1 illustrates an anchor bolt assembly about to be inserted into the hole of a fixture to be fastened to a masonry wall;

FIG. 2 is an exploded view of the assembly;

FIG. 3 shows the assembly anchored in a hole in the masonry wall and securing the fixture to the surface thereof; and FIG. 4 is a separate perspective view of the expandable sleeve of the assembly in the expanded state.

DESCRIPTION OF INVENTION

Referring now to the figures, an anchor bolt assembly in accordance with the invention, generally designated by numeral 10, is shown in conjunction with a fixture 11 in the form of a bracket. The assembly serves to fasten fixture 11 to a masonry wall 12 having a hole 13 drilled therein to receive the assembly. Fixture 11 has a hole 14 therein in registration with masonry hole 13 so that the assembly passes through the fixture hole before it enters the masonry hole.

Assembly 10 includes a threaded bolt 15 of uniform diameter whose lower end terminates in an expander element 15A having the form of a truncated cone whose maximum diameter is substantially the same as the diameter of masonry hole 13.

Bolt 15 extends through an expandable sleeve 16 which takes the form of a metal tube having longitudinal slots cut therein at equi-angular positions to define three deflectable tines 16A, 16B and 16C. The outside diameter of sleeve 16 in the unexpanded state is the same as the maximum diameter of the expander element, whereas the inside diameter thereof is smaller. Hence when the tapered expander element is forced axially into the sleeve, it causes the tines thereof to deflect outwardly.

Bolt 15 is threadably received within an internally-threaded tube 17 of uniform diameter whose outer diameter matches said maximum diameter, the tube being provided with an enlarged head 18 having a conical formation, the head having a slot 18A therein engageable by a screw driver. Alternatively, head 18 may be in hexagonal or any other configuration that is engageable by a torque-producing tool such as a wrench.

Interposed between tube 17 and sleeve 16 is a ring 19 of deformable material, such as a lead alloy, or nylon or other synthetic plastic material, the outer diameter of the ring matching said maximum diameter. Thus the entire assembly except for head 18 has the same outer diameter, making it possible to insert the assembly through fixture hole 14 into masonry hole 13. Except for ring 19, the assembly is preferably fabricated of steel to satisfy fire code requirements.

When the anchor bolt assembly is first inserted, head 18 nests loosely in hole 14 of the fixture. When head 18 is then turned by a screwdriver, it causes tube 17 to turn, this action causing bolt 14 threadably received therein which is prevented from rotating to advance axially toward tube 17. As bolt 14 advances, expander element 15A forces its way into sleeve 16, bring about dilation of tines 16A, 16B and 16C to lock the sleeve into the masonry hole until a point is reached where no further bolt advance is possible.

Further turning of head 18 then causes tube 17 to advance toward bolt 15, which is made possible by the yieldability of ring 19. This action deforms ring 19 and causes head 18 to press against the face of fixture 11 until a point is reached where it is no longer possible to turn the head. At this point the fixture is tightly held against the masonry surface and displacement thereof is resisted.

While there has been shown and described a preferred embodiment of an improved anchor bolt assembly in accordance with the invention, it will be appreciated that many changes and modifications may be made therein without, however, departing from the essential spirit thereof. Thus the expandable sleeve need not be of the type shown and may be in the form shown in the prior art patents referred to herein.

I claim:

1. An anchor bolt assembly adapted to fasten a fixture having a hole therein against the surface of masonry having a hole drilled therein, said assembly being insertable through the fixture hole into the masonry hole and comprising:

A  a threaded bolt having an expander element at the lower end thereof;

B  an expandable sleeve through which said bolt extends, said sleeve being formed of a tube having longitudinal slots therein to define deflectable tines extending from an end collar, an axial advance of said bolt causing the expander element to force its way into the tines of the sleeve to effect expansion thereof against the wall of the masonry hole;

C  an actuating element defined by an internally-threaded tube receiving the upper end of the bolt and provided at its upper end with an enlarged head which lies outside of said fixture; and D  means to tightly secure said fixture against displacement defined by a deformable normally rigid ring on said bolt interposed between the lower end of the actuating element and the collar of the sleeve, the diameter of the ring being substantially the same as that of the collar, the bolt when said head is turned by a tool, being advanced toward the actuating element until the expanded sleeve is locked within the masonry hole and the ring is pressed between the collar and the actuating element without deformation of the ring, further turning of said head causing said actuating element to deform said ring and to advance toward the locked sleeve, said ring having a normal axial length which is shortened under deformation to permit said actuating element to advance to a degree which causes the head to press against the face of said fixture to tightly secure said fixture against displacement.

2. An assembly as set forth in claim 1, wherein said expander element has a truncated conical formation.

3. An assembly as set forth in claim 1, wherein said head has a conical formation with a screw driver slot therein.

4. An assembly as set forth in claim 1, wherein said bolt, said sleeve and said tube are fabricated of steel.

5. An assembly as set forth in claim 1, wherein said ring is fabricated of plastic material.

6. An anchor bolt assembly adapted to fasten a fixture having a hole therein against the surface of masonry having a hole drilled therein, said assembly being insertable through the fixture hole into the masonry hole and comprising:

A. a threaded bolt having an expander element at the lower end thereof;

B. an expandable sleeve through which said bolt extends, said sleeve being formed of a tube having longitudinal slots therein to define deflectable tines extending from an end collar, an axial advance of said bolt causing the expander element to force its way into the tines of the sleeve to effect expansion thereof against the wall of the masonry hole;

C. an internally-threaded actuating element receiving the upper end of the bolt, said element being turnable by a tool and having a surface which is engageable with the outside of said fixture; and D. means to tightly secure said fixture against displacement defined by a deformable normally rigid ring on said bolt interposed between the lower end of the element and the collar of the sleeve, the diameter of the ring being substantially the same as that of the collar, the bolt when said element is turned being advanced toward the actuating element until the expanded sleeve is locked within the masonry hole and the ring is pressed between the collar and the actuating element without deformation of the ring, further turning of said actuating element causing said actuating element to deform said ring and to advance toward the locked sleeve, said ring having a normal axial length which is shortened under deformation to permit said actuating element to advance to a degree which causes the element surface to press against said fixture to tightly secure said fixture against displacement.

* * * * *